No. 745,815. PATENTED DEC. 1, 1903.
W. W. GIBSON.
HOSE COUPLING.
APPLICATION FILED APR. 21, 1903.
NO MODEL.

Witnesses:
Geo. B. Rowley
E. E. Potter

Inventor:
W. W. Gibson.
By H. C. Evert & Co.
Attorneys

THE NORRIS PETERS CO., PHOTO-LITHO., WASHINGTON, D. C.

No. 745,815. Patented December 1, 1903.

UNITED STATES PATENT OFFICE.

WILLIAM W. GIBSON, OF FALLSTON, PENNSYLVANIA.

HOSE-COUPLING.

SPECIFICATION forming part of Letters Patent No. 745,815, dated December 1, 1903.

Application filed April 21, 1903. Serial No. 153,599. (No model.)

*To all whom it may concern:*

Be it known that I, WILLIAM W. GIBSON, a citizen of the United States of America, residing at Fallston, in the county of Beaver and State of Pennsylvania, have invented certain new and useful Improvements in Hose-Couplings, of which the following is a specification, reference being had therein to the accompanying drawings.

This invention relates to certain new and useful improvements in hose-couplings, and has for its primary object to provide novel and effective means for securely joining two sections or members of a coupling together.

Briefly described, the invention comprises a female member having a tapering socket portion and provided near its engaging end on its inner face with opposite-disposed lugs which are adapted to engage in oppositely-disposed bayonet-shaped grooves provided therefor in the periphery of the substantially plug-shaped extension carried by the male member. The female member also has oppositely-disposed notches in its engaging end, one of which receives the slidable locking-pin for securing the members against accidental displacement.

Other details of construction entering into my invention, together with the ones above enumerated, will be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1:
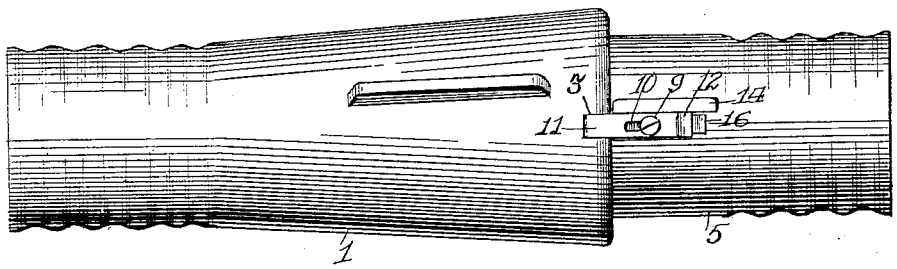
Figure 2:
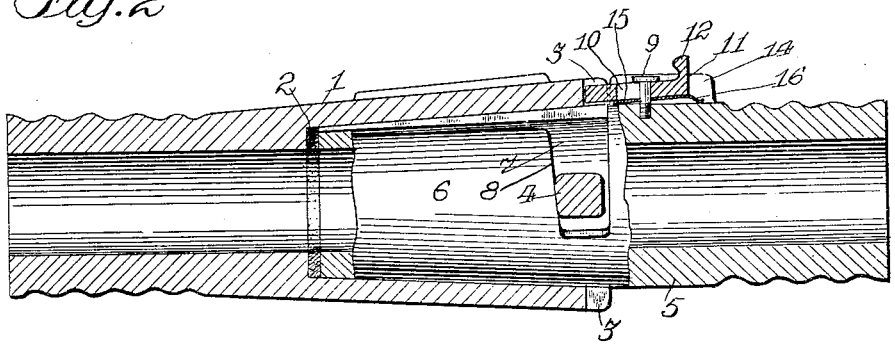
Figure 3:
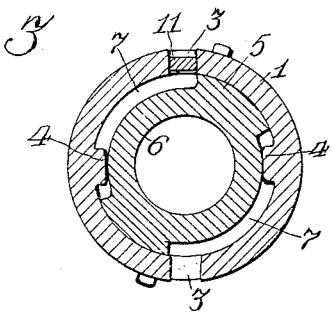
Figure 4:

Figure 1 is a top plan view of my improved hose-coupler, showing the members or sections in the coupled position. Fig. 2 is a central longitudinal sectional view thereof. Fig. 3 is a transverse vertical sectional view. Fig. 4 is a detached detail perspective view of the spring which holds the locking-pin in the locked or unlocked position.

To put my invention into practice, I provide a female member 1, which is of the tapering or flared form and has a correspondingly-shaped recess in its engaging end, against the inner end of which recess is packed a flexible gasket 2. This female member is provided with a corrugated hose-receiving end and at its engaging end is provided with oppositely-disposed notches 3. On its inner face adjacent to the engaging end is provided opposite-disposed lugs 4. The male section 5 is likewise provided with a corrugated hose-receiving outer end, and this male member carries a tapered or substantially plug-shaped extension 6, which is provided on its opposite sides with bayonet-shaped grooves 7, which are adapted to receive the lugs 4 in interlocking engagement therewith, the wall 8 of these grooves being at an incline, as is also the corresponding wall of the lugs 4, whereby the two walls will frictionally engage when brought into contact and firmly hold the members in engagement. The male member 5 carries a pin or headed stud 9, which passes through the slot 10, provided therefor in the locking-pin 11, adapted to have longitudinal movement on said headed pin or stud 9, whereby to be engaged in one or the other of the notches 3 in order to hold the members against accidental displacement. The lever 10 is provided with an upwardly-extending thumb-piece 12, which projects slightly above the longitudinal rib 14, formed on the periphery of the male member 5, to form a guard for the locking-pin 11 and also to prevent the rotation of this lever on its pin 9. Placed on the pin 9, underneath the pin 11, is a spring 15, provided at its rear end with a heel 16, whereby the lever will be held either in its retracted or forward position, as it may be placed, the spring 15 holding the said lever up against the head of the pin 9.

To connect the sections together, the locking-pin 11 is retracted and the lugs 4 are engaged in the longer arms or legs of the bayonet-shaped slots and the members forced together, and one member or the other is then given a quarter-turn, so as to engage the lugs 4 in the arms or legs of the bayonet-shaped groove, as seen in Fig. 2 of the drawings. When the members are so engaged, one of the notches 3 will be opposite the locking-pin 11, and the forward end of the latter is then forced into said notch, whereby to hold the members against accidental displacement.

It is to be noted that the coupler is quick and effective and that while I have shown and described the same in detail as practiced by me, yet various slight changes may be made in the details of construction without departing from the general spirit of the invention.

Having fully described my invention, what I claim as new, and desire to secure by Letters Patent, is—

In a hose-coupling, a female member having a tapering socket and provided with a correspondingly-shaped recess, oppositely-disposed lugs carried on the inner face of said female member adjacent the engaging end thereof, the said member having oppositely-disposed notches at its engaging end, a male member having a tapering or plug-shaped extension adapted to engage in the recess in the female member and having bayonet-shaped grooves or recesses to receive the lugs of the female member, and means for securing the parts together comprising a slotted locking-pin, a headed stud mounted on the male member adapted to engage in the slot of said locking-pin to permit of a sliding movement of the said lever, said lever being adapted to slide into engagement with notches of the female member, a spring mounted beneath said locking-pin adapted to normally elevate the same, said spring being held in place by means of a headed stud and a guard member mounted on the male member of the coupling adjacent to the locking-pin adapted to guard the latter and prevent rotation therein, substantially as described.

In testimony whereof I affix my signature in the presence of two witnesses.

WILLIAM W. GIBSON.

Witnesses:
C. S. ANDERSON,
C. H. GIBSON.